United States Patent
Yang et al.

(10) Patent No.: US 8,264,453 B2
(45) Date of Patent: *Sep. 11, 2012

(54) BACKLIGHT CONTROL DEVICE AND METHOD FOR CONTROLLING A DRIVING CURRENT OF AN LED

(75) Inventors: Chih-Hsiang Yang, Hsin-Chu (TW); Fu-Cheng Wei, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,433

(22) Filed: Aug. 11, 2011

(65) Prior Publication Data

US 2011/0292027 A1    Dec. 1, 2011

Related U.S. Application Data

(63) Continuation of application No. 11/940,298, filed on Nov. 14, 2007, now Pat. No. 8,022,923.

(30) Foreign Application Priority Data

Oct. 30, 2007 (TW) .............................. 96140821 A (51) Int. Cl.
G09G 3/36 (2006.01)
(52) U.S. Cl. ........................................ 345/102; 345/82

(58) Field of Classification Search .................... 345/44, 345/82, 84, 102, 204, 76; 315/169.1, 169.3
See application file for complete search history.

(56) References Cited

U.S. PATENT DOCUMENTS

| | | | |
|---|---|---|---|
| 4,897,639 A | 1/1990 | Kanayama | |
| 7,317,403 B2* | 1/2008 | Grootes et al. | 345/102 |
| 7,633,463 B2 | 12/2009 | Negru | |
| 2002/0047642 A1 | 4/2002 | Miyagawa | |
| 2005/0243022 A1 | 11/2005 | Negru | |
| 2006/0261754 A1 | 11/2006 | Lee | |

FOREIGN PATENT DOCUMENTS

| | | |
|---|---|---|
| TW | 200633251 | 9/2006 |
| TW | 200719304 | 5/2007 |

* cited by examiner

*Primary Examiner* — Regina Liang
(74) *Attorney, Agent, or Firm* — Winston Hsu; Scott Margo (57) ABSTRACT

A backlight control device for controlling a driving current of an LED is disclosed. By controlling current outputs from current sources of a plurality of current output units, a display will be able to generate desirable backlight. Then by adjusting currents output by the plurality of current output units, brightness of a plurality of pixels can be dynamically adjusted. The brightness of pixels with higher gray levels can be increased while the brightness of pixels with lower gray levels can be decreased, thereby improving the contrast of image and saving power consumption.

11 Claims, 9 Drawing Sheets

_(10)_ Patent No.: US 8,264,453 B2

BACKLIGHT CONTROL DEVICE AND METHOD FOR CONTROLLING A DRIVING CURRENT OF AN LED

CROSS REFERENCE TO RELATED APPLICATIONS

This application is a continuation of U.S. patent application Ser. No. 11/940,298, entitled "BACKLIGHT CONTROL DEVICE AND METHOD FOR CONTROLLING A DRIVING CURRENT OF AN LED," filed Nov. 14, 2007, the contents of which are incorporated herein by reference.

BACKGROUND OF THE INVENTION

1. Field of the Invention

The present invention relates to a backlight module of a thin film transistor liquid crystal display, and more particularly, to a backlight control device for controlling a driving current of an LED.

2. Description of the Prior Art

Ordinarily, the current control integrated circuit of a light-emitting diode (LED) uses fixed resistance to control the driving current of the backlight module to control the brightness of the backlight module. The disadvantage is that once the resistance value of the bias resistor is established, the driving current of backlight module cannot be adjusted, and a long-term use of circuit components can cause an unexpected variation in the driving current of backlight module. Further, the driving current in certain types of LED, such as Organic LED (OLED), may be changed due to a change in the operating temperature of the current regulator. As a result, the brightness of the LED in the backlight module may be adversely affected. Therefore, a method and an apparatus capable of controlling the driving current for backlight modules in LCD systems are needed.

Figure 1:
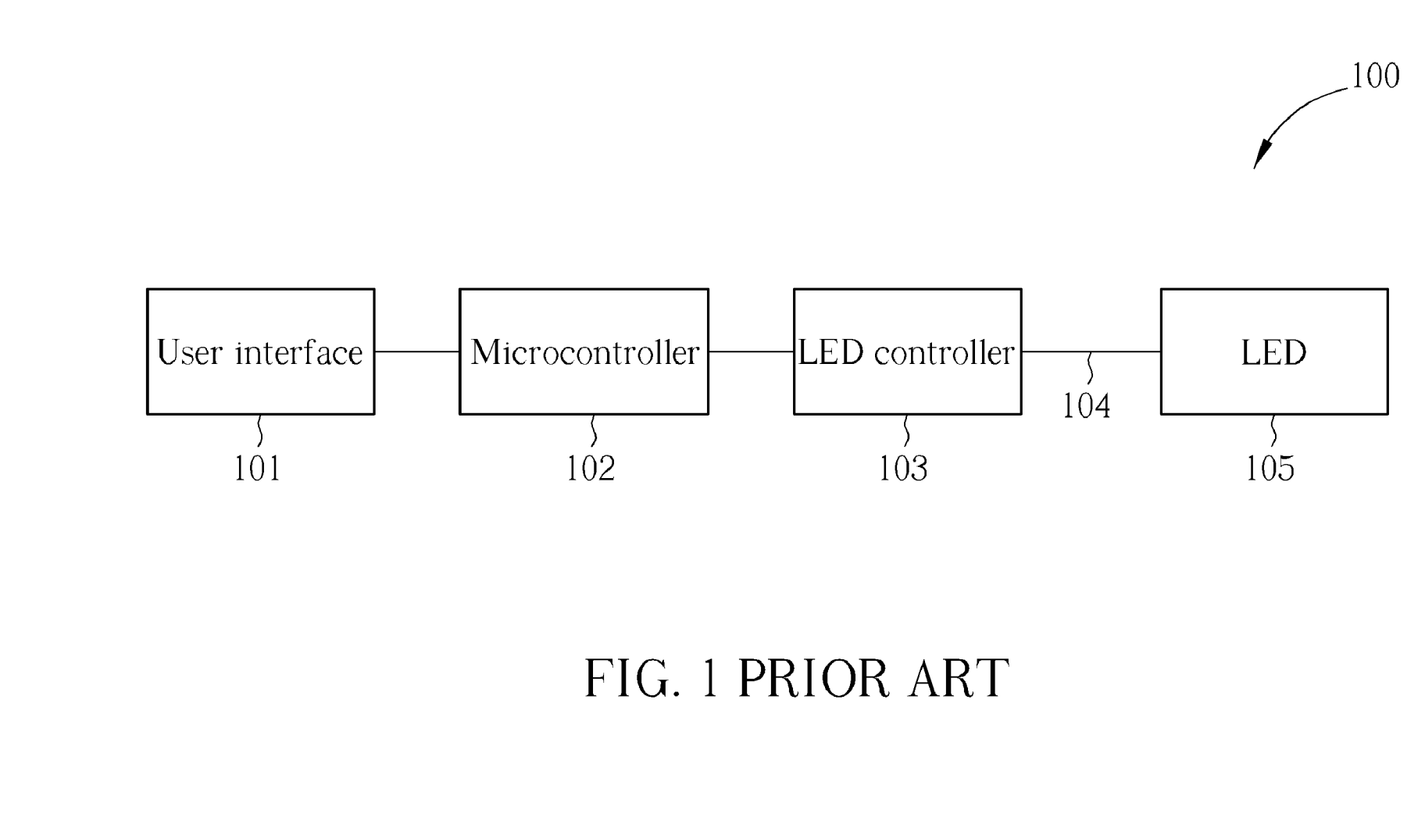
FIG. 1 illustrates a prior art programmable control method to regulate the brightness of LEDs in a backlight module.

FIG. 1 illustrates a prior art programmable control method to regulate the brightness of LEDs in a backlight module 100. Microcontrollers are an example where users can input the desired current value or voltage value to an LED controller 103 through a user interface 101 of the microcontroller 102. According to the current value or voltage value stored in registers, the desired current value or voltage value is generated and provided to the current output unit, and the output current 104 generated by the current output unit is used to regulate the brightness of an LED 105.

However, the method described above uses programming interfaces to regulate the brightness of LEDs, so that the backlight can not regulate the brightness in displaying video. Therefore, the related art can not dynamically reduce the brightness of backlight when the lower brightness is desired. Further, the related art can not dynamically enhance the brightness of backlight when the higher brightness is desired. The related art uses brightness predetermined and inputted by a user, and the backlight module can not dynamically regulate the brightness later on. As a result, it causes low quality in the brightness contrast of images.

SUMMARY OF THE INVENTION

An embodiment of the present invention discloses a backlight control device for controlling a driving current of a light-emitting diode. The backlight control device comprises at least a pulse width modulation (PWM) control unit, at least a current output unit coupled to the PWM control unit, and a shift register coupled to the PWM control unit for storing control signals for controlling the PWM control unit.

Another embodiment of the present invention discloses a method for controlling a driving current of an LED. The method comprises outputting a predetermined current to cause the LED to emit uniform light, and after outputting the predetermined current, outputting a voltage proportional to brightness of an image to be displayed.

These and other objectives of the present invention will no doubt become apparent to those of ordinary skill in the art after reading the following detailed description of the preferred embodiment that is illustrated in the various figures and drawings.

DETAILED DESCRIPTION

Figure 2:
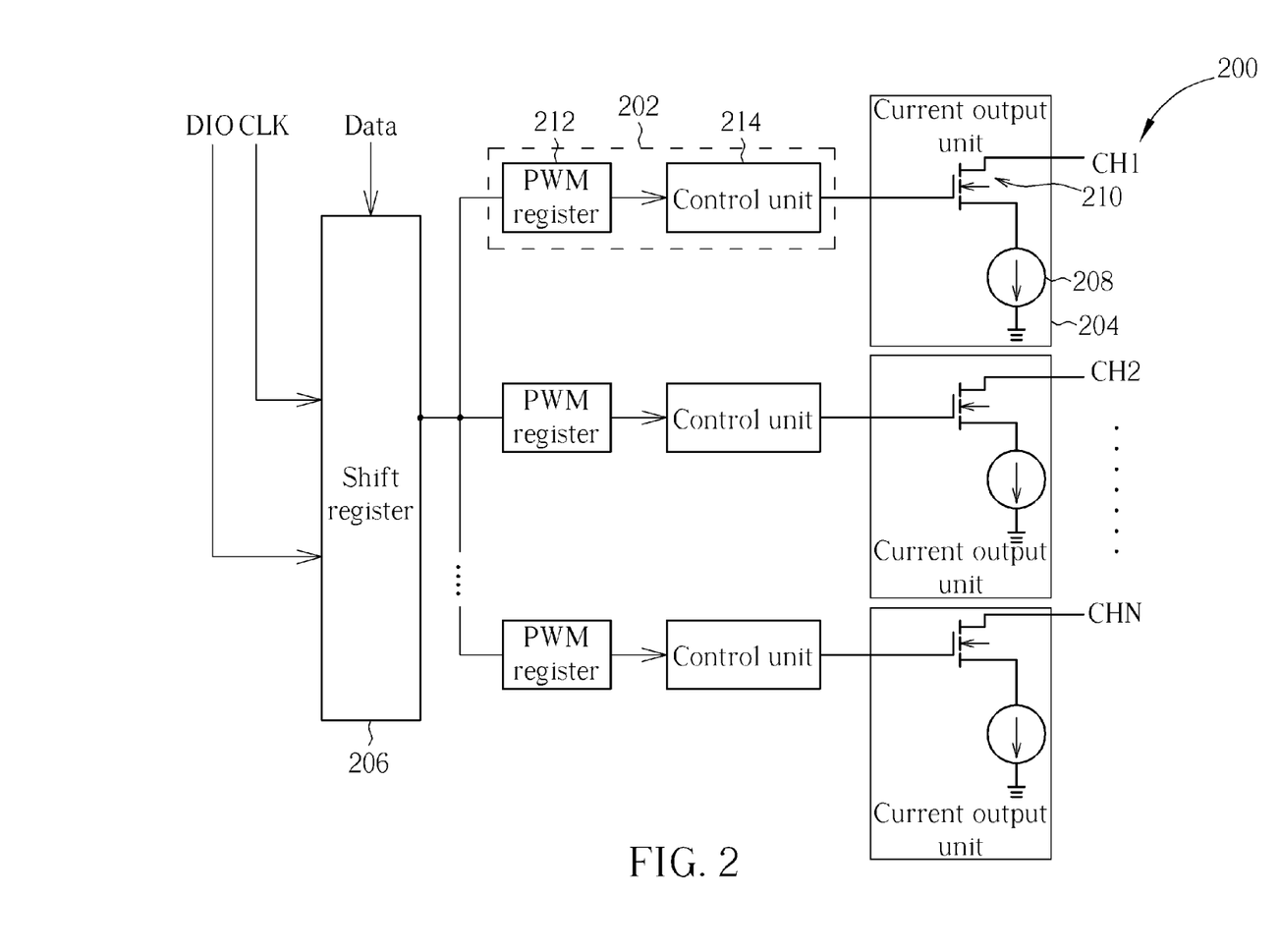
FIG. 2 illustrates a backlight control device according to a first embodiment of the present invention.

FIG. 2 illustrates a backlight control device 200 according to a first embodiment of the present invention. The backlight control device 200 comprises a plurality of PWM control units 202 each including a PWM register 212 and a control unit 214, a plurality of current output units 204 coupled to the PWM control units 202, and a shift register 206 coupled to the PWM registers 212 of the PWM control units 202. The shift register 206 stores brightness control signals for the PWM control units 202.

Each current output unit 204 comprises a current source 208, and an NMOS 210. The current source 208 is coupled to a low voltage terminal such as ground. The source of NMOS 210 is coupled to the current source 208, and the gate is coupled to the PWM control unit 202. Each PWM control unit 202 comprises a PWM register 212 coupled to the shift register 206 for storing a brightness control signal. The control unit 214 outputs a corresponding PWM signal according to the brightness control signal stored in the PWM register 212. The PWM signal is a periodic signal which in some periods is at a high voltage level and in other periods is at a low voltage level. The periodic signal is used to regulate the current by opening and closing the gate of the NMOS 210. When the PWM signal is at the high voltage level, the gate of the NMOS 210 is opened. Thus a higher percentage of high voltage in the PWM signal corresponds to a greater current output by the current output unit 204, which corresponds to higher backlight brightness. On the other hand, a lower percentage of high voltage in the PWM signal corresponds to a lower current output by the current output unit 204, which corresponds to lower backlight brightness. Therefore the PWM signal outputted by the control unit 214 can dynamically regulate the backlight brightness according to the display signal. The input of the control unit 214 is coupled to the PWM register 212. The output of the control unit 214 is coupled to the gate of the NMOS 210 which is used to regulate the output current of the current output unit 204 through opening and closing the gate of the NMOS 210.

In this embodiment, the shift register 206 is coupled to a plurality of PWM control units 202, and the memory size of the shift register 206 is not greater than the total memory size of all PWM registers 212. Therefore, a brightness control signal of a first channel is stored in the shift register 206, and then it is transferred to a PWM register 212 of the first channel. Afterwards a brightness control signal of a second channel is stored in the shift register 206, and then it is transferred to a PWM register 212 of the second channel. The shift register 206 transfers brightness control signals to PWM registers 212 of different channels sequentially so as to control the output currents of different current output units 204.

Figure 3:
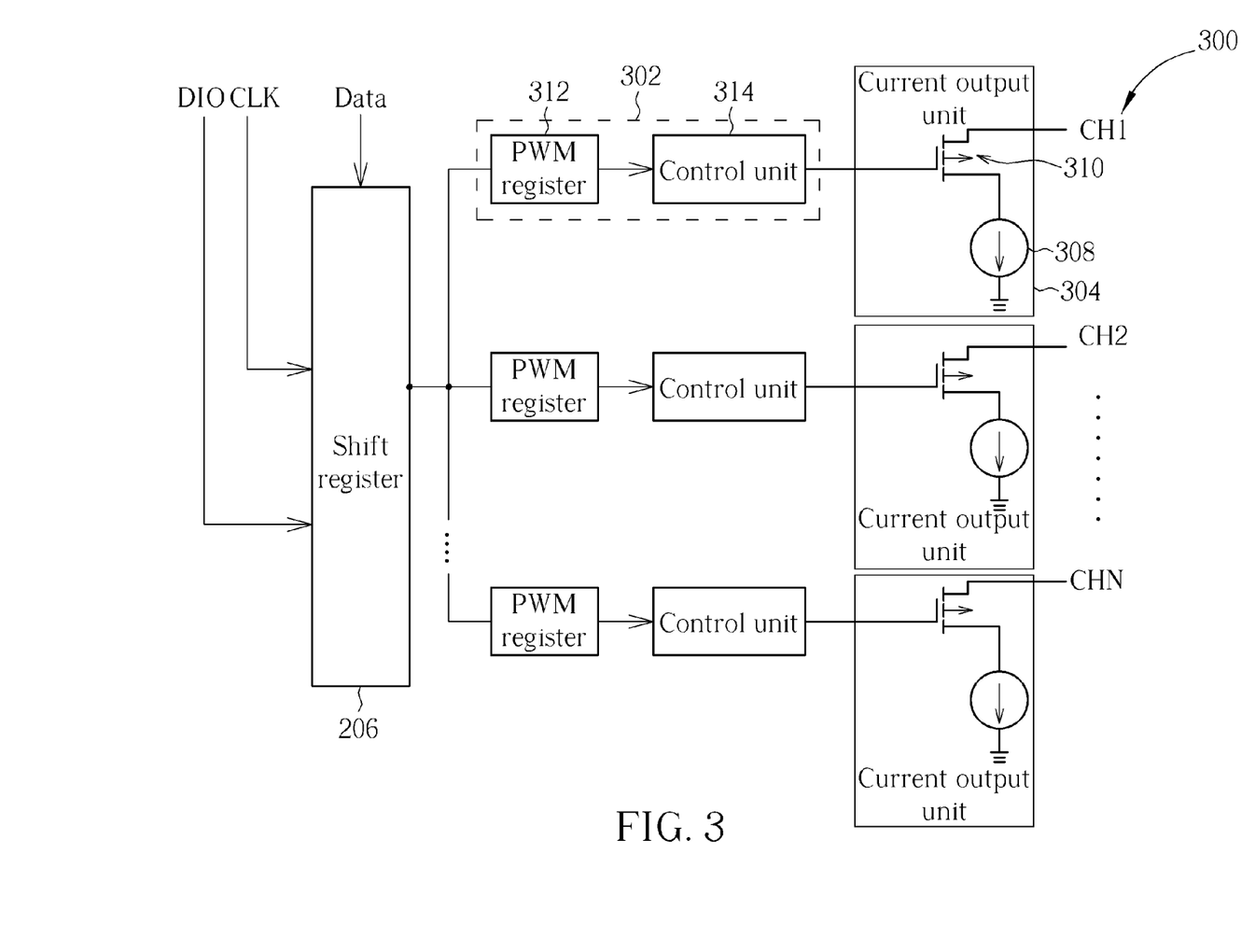
FIG. 3 illustrates of a backlight control device according to a second embodiment of the present invention.

FIG. 3 illustrates of a backlight control device 300 according to a second embodiment of the present invention. The difference between the backlight control device 300 and backlight control device 200 is that the current output unit 304 of the backlight control device 300 comprises a current source 308 and a PMOS 310. The current source 308 is coupled between a low voltage terminal such as ground and the drain of PMOS 310. Like the backlight control device 200, the backlight control device 300 regulates the output current of the current output unit 304 through opening and closing of the gate of PMOS 310.

The PWM signal outputted from the control unit 314 is a periodic signal which in some periods is at a high voltage level and in other periods is at a low voltage level. The periodic signal is used to regulate the current by opening and closing the gate of the PMOS 310. When the PWM signal is at the low voltage level, the gate of the PMOS 310 is opened. Thus a higher percentage of low voltage in the PWM signal corresponds to a greater current output by the current output unit 304, which corresponds to higher backlight brightness. On the other hand, a lower percentage of low voltage in the PWM signal corresponds to a lower current output by the current output unit 304, which corresponds to lower backlight brightness. Therefore the PWM signal outputted by the control unit 314 can dynamically regulate the backlight brightness according to the display signal. The input of the control unit 314 is coupled to the PWM register 312. The output of the control unit 314 is coupled to the gate of the PMOS 310 which is used to regulate the output current of the current output unit 304 through opening and closing the gate of the PMOS 310.

Figure 4:
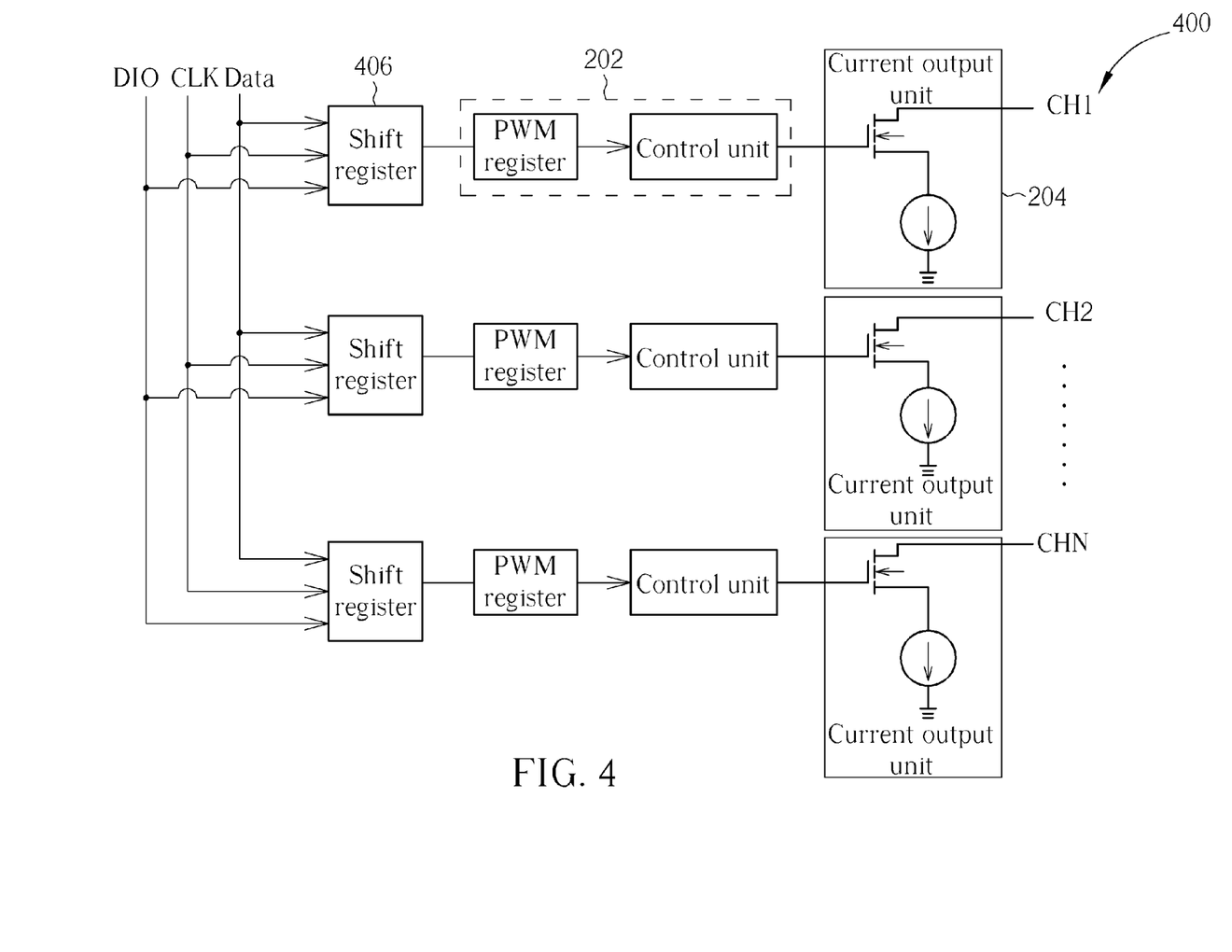
FIG. 4 illustrates a backlight control device according to a third embodiment of the present invention.

FIG. 4 illustrates a backlight control device 400 according to a third embodiment of the present invention. The difference between the backlight control device 400 and backlight control device 200 is that the backlight control device 400 comprises a plurality of shift registers 406, and they are coupled to a plurality of PWM control unit 202.

The first shift register is coupled to the PWM control unit of the first channel. The second shift register is coupled to the PWM control unit of the second channel and so on. Each shift register 406 is coupled to the PWM control unit 202 of a corresponding channel. Compared to the first embodiment shown in FIG. 2, the one-to-one coupling in FIG. 4 is a lot simpler than the one-to-many coupling in FIG. 2.

Figure 5:
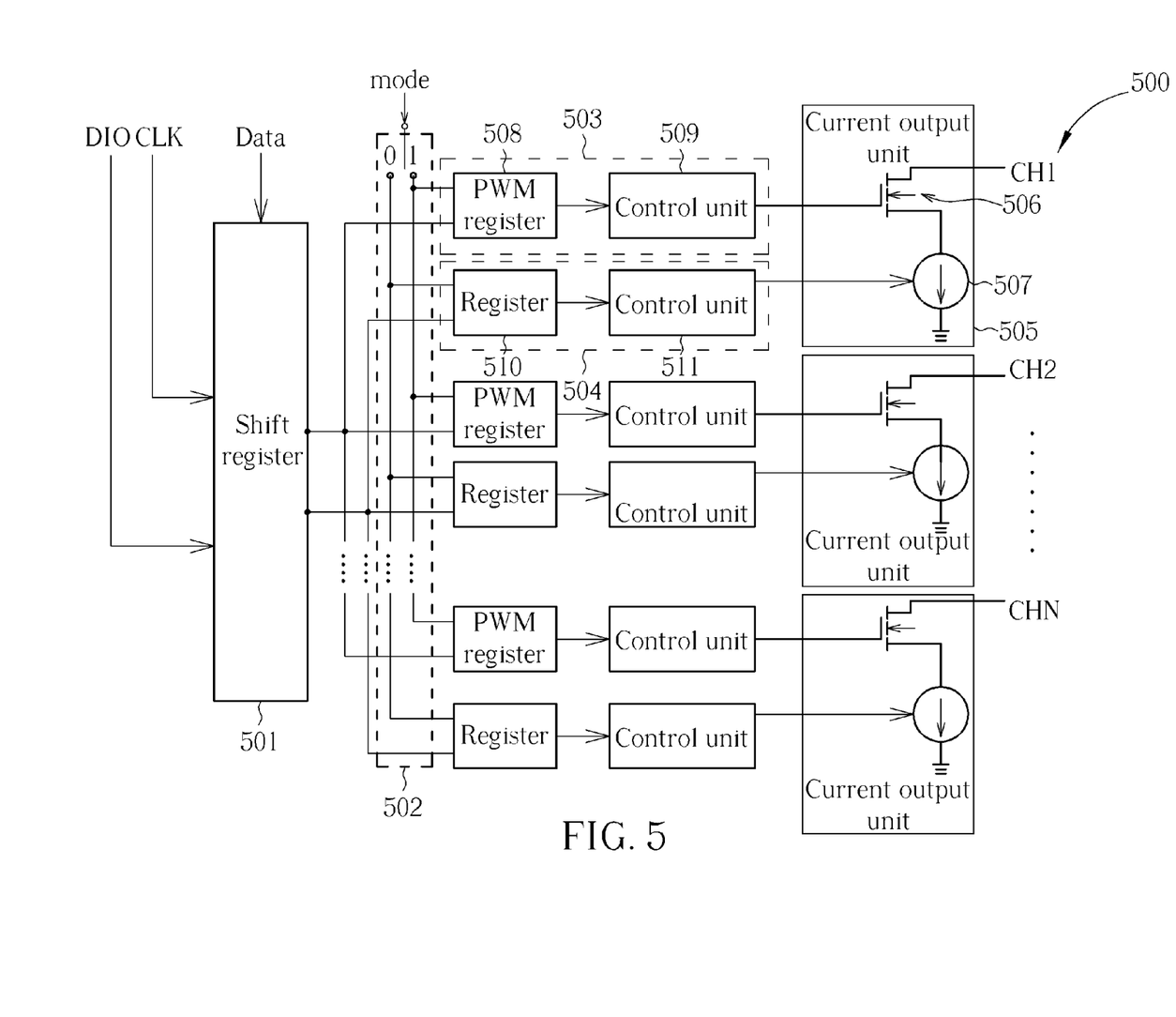
FIG. 5 illustrates a backlight control device according to a fourth embodiment of the present invention.

FIG. 5 illustrates a backlight control device 500 according to a fourth embodiment of the present invention. The backlight control device 500 comprises a plurality of PWM control units 503, a plurality of current control units 504, a plurality of current output units 505, a selector 502, and a shift register 501 for storing control signals of the PWM control units or control signals of the current control units 504.

Each current output unit 505 comprises a current source 507 and an NMOS 506. The current source 507 is coupled between a low voltage terminal and the source of the NMOS 506. The gate of the NMOS 506 is coupled to the PWM control unit 503.

Each PWM control unit 503 comprises a PWM register 508 and a control unit 509. The first input of the PWM register 508 is coupled to the selector 502, the second input of the PWM register 508 is coupled to the shift register 501, and the output of the PWM register 508 is coupled to the input of a corresponding control unit 509. The output of the control unit 509 is coupled to the gate of the corresponding NMOS 506. Therefore, The backlight control device 500 regulates the output current of the current output unit 505 through opening and closing the gate of NMOS 506.

Each current control unit 504 comprises a register 510 and a control unit 511. The first input of the register 510 is coupled to the selector 502, and the second input of the register 510 is coupled to the shift register 501. The output of the register 510 is coupled to the input of a corresponding control unit 511. The output of the control unit 511 is coupled to the source of the corresponding NMOS 506, and is used to regulate the voltage of the source so as to regulate the output current of output current unit 505.

Further, due to the differences among electronic components of a backlight module, or due to a long time use of certain electronic components, the driving current of the backlight module may have unpredictable changes. The driving current in certain types of LEDs, such as organic LEDs (OLEDs), can change due to a change in the operating temperature of the current regulator. The current control unit 504 allows a user to adjust the luminance of LEDs inside the backlight module through the programmable interface. For instance, a microcontroller can use an $I^2C$ programmable interface to input a desired current or voltage value to the shift register 501, and then the desired value will be transferred to the current control unit 504. According to the value stored in the register 510, the control unit 511 controls the current output unit 505 to regulate the current output by the current output unit 505 so as to regulate the brightness of LEDs.

In this embodiment, the first output of the shift register 501 is coupled to a plurality of PWM control units 503 and the second output of the shift register 501 is coupled to a plurality of current control units 504. Whether the output of the shift register 510 is to be input to the PWM control units 503 or the current control units 504 depends on the mode of the selector 502. Therefore the shift register 501 will store the control signals for every channel and transfer those control signals to the PWM control units 503 or the current control units 504 in sequence.

Figure 6:
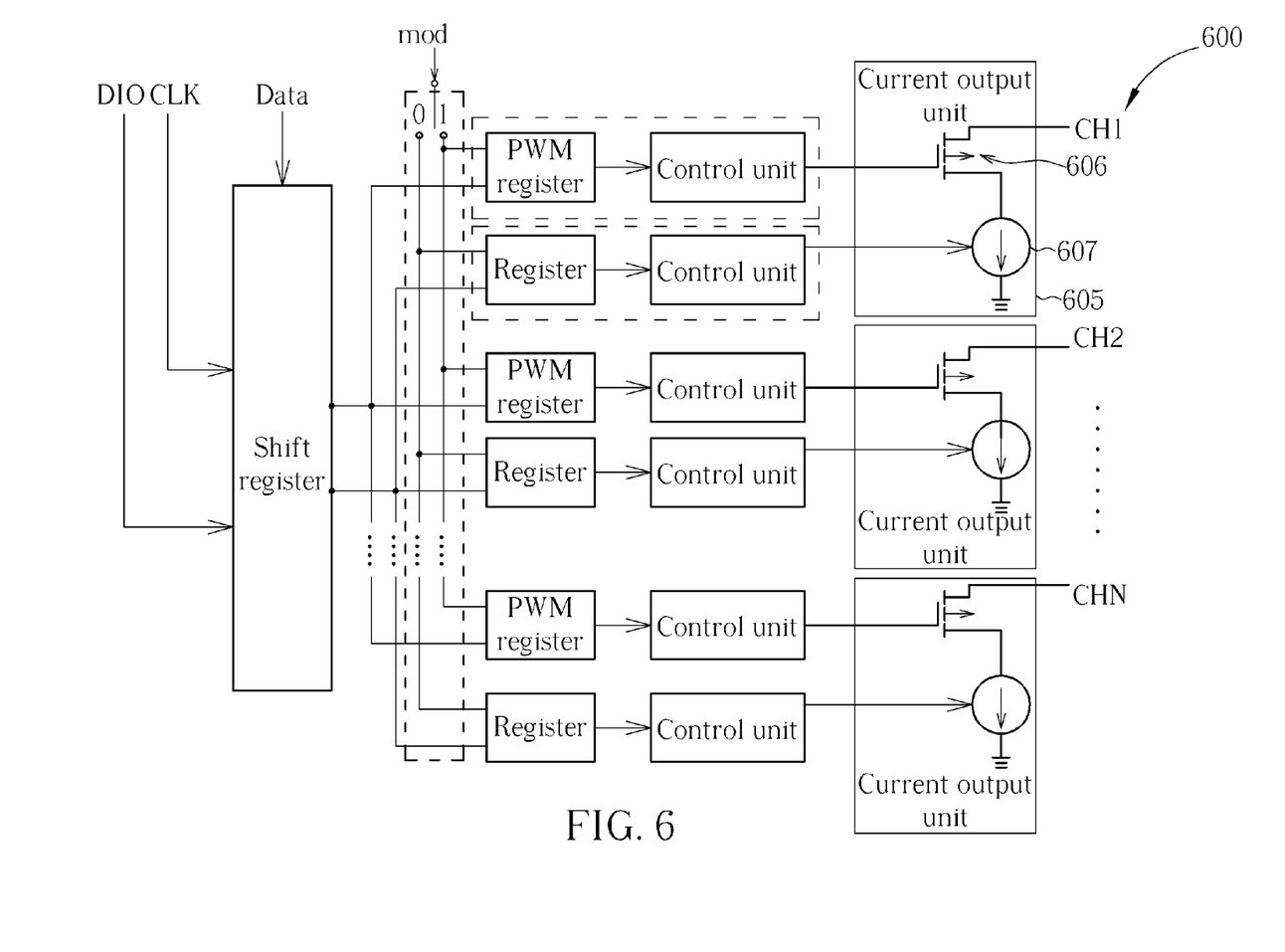
FIG. 6 illustrates a backlight control device according to a fifth embodiment of the present invention.

FIG. 6 illustrates a backlight control device 600 according to a fifth embodiment of the present invention. The difference between the backlight control device 600 and backlight control device 500 is that the current output unit 605 of the backlight control device 600 comprises a current source 607 and a PMOS 606. The current source 607 is coupled between a low voltage terminal and the drain of PMOS 606. Like the backlight control device 500, the backlight control device 600 regulates the output current of the current output unit 605 through opening and closing the gate of PMOS 606.

In the embodiment of FIG. 5, by regulating the currents of the current output units 505 from the current control units 504 through the programmable interface, a user can regulate the brightness of LEDs in the backlight module so that uniform brightness of backlight can be obtained when the grey levels of different channels are the same. The application can be used in a PC monitor because most of its frames are static, and the distance between a user's eyes and the screen of monitor is relatively short. The user will feel unpleasant if the backlight is not uniform due to the characteristics of different LED electronic components. The application can also be used in a monitor of the medical science field. If the LEDs cannot generate backlight of uniform brightness, the image displayed on the monitor may be distorted and result in misjudgments of physicians.

The embodiments in FIG. 2, FIG. 3 and FIG. 4 do not have the current control units 504 shown in FIG. 5. The reason is that most frames displayed on TV are dynamic. Thus the grey levels change from picture to picture. In NTSC system there are 24 frames per second showing on TV, so it is difficult for a human eye to identify if the backlight is uniform or not. Instead the human eye is more sensitive to brightness contrast. Therefore, when displaying a frame or a section with lower brightness, the brightness of backlight of the frame or section is reduced. And when displaying a frame or a section with higher brightness, the brightness of backlight of the frame or section is enhanced. This will result in a higher visual contrast. Further when using lower brightness for displaying a dimmer image, power can be saved due to a lower current. Besides, the TV can be installed with the current control unit 504 to more accurately reflect the image to be displayed. In this case, the TV can be switched between the dynamic PWM mode or current mode according to the user's need to improve the quality of image display.

In the related art, a desired brightness value is input by a user. It can not dynamically regulate the brightness of backlight according the grey levels of frames to be displayed causing a low quality of image contrast. In the present invention, the backlight of uniform brightness can be provided and power can be saved by dynamically adjusting the brightness of backlight. Thus the present invention solves the problem of non-uniform backlight, enhances the brightness contrast, and saves power.

Figure 7:
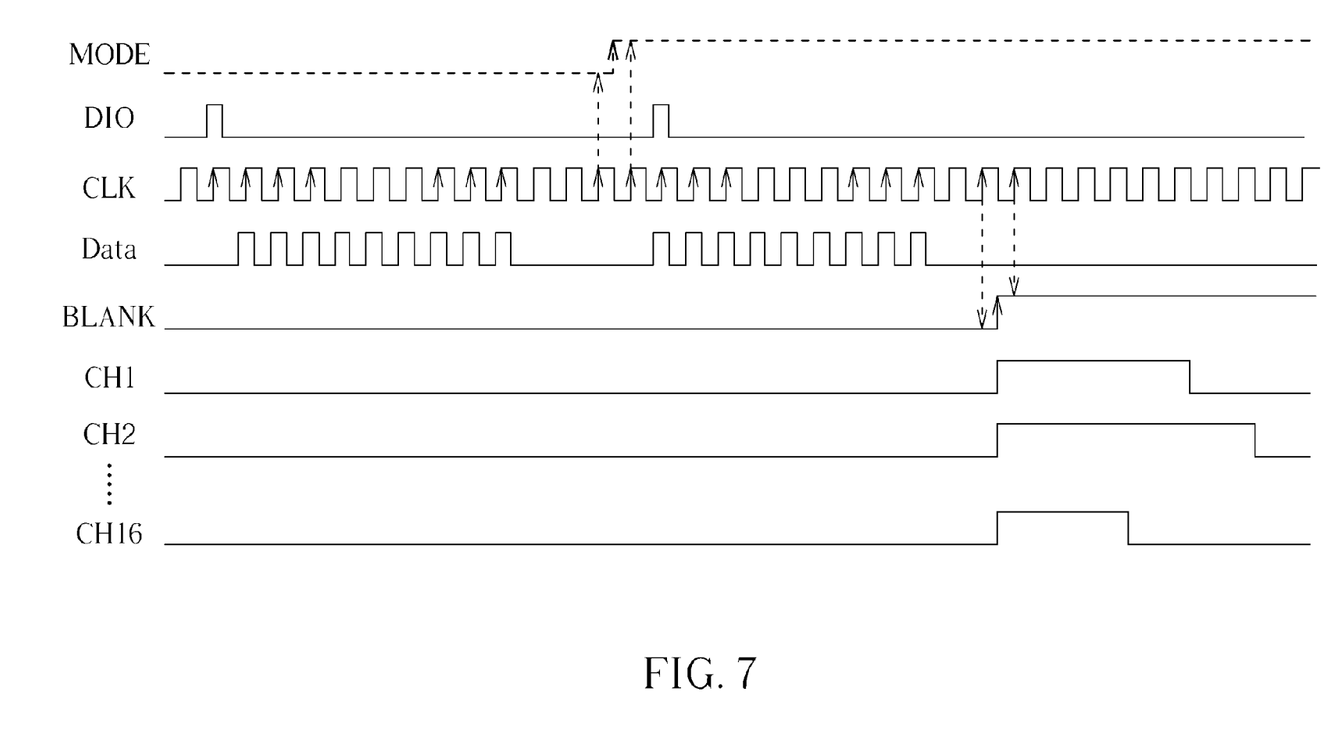
FIG. 7 illustrates a basic operating timing diagram according to the present invention.

FIG. 7 illustrates a basic operating timing diagram according to the present invention. A low voltage signal MODE means that the backlight control device is in the current mode, and a high voltage signal MODE means that the backlight control device is in the dynamic PWM mode. The data will be latched according to signal CLK when the signal DIO is triggered. When the backlight control device is in the current mode, the latched data are desired current values. On the other hand, when the backlight control device is in the dynamic PWM mode, the latched data are grey levels of images to be displayed. The rising edge of signal MODE signals that the operation of LED current sink IC is changed from the current mode to dynamic PWM mode. At this moment, the desired current values are latched in the register of the current control unit.

In the dynamic PWM mode, when the signal BLANK is at a rising edge, the data are the grey levels of images to be displayed and will be latched by the PWM register. When the signal BLANK is at the low voltage, the outputs of all channels are equal to zero. When the signal BLANK is at the high voltage, the outputs of all channels are dependent on the grey levels latched by the PWM registers. The next frame appears when the signal BLANK is at the falling edge. At this time, the control signal of the PWM control unit is reset to zero so as to calculate the control signals for the next frame.

The signal CLK is the timing signal for the PWM control units, the PWM registers and registers of current control units.

Figure 8:
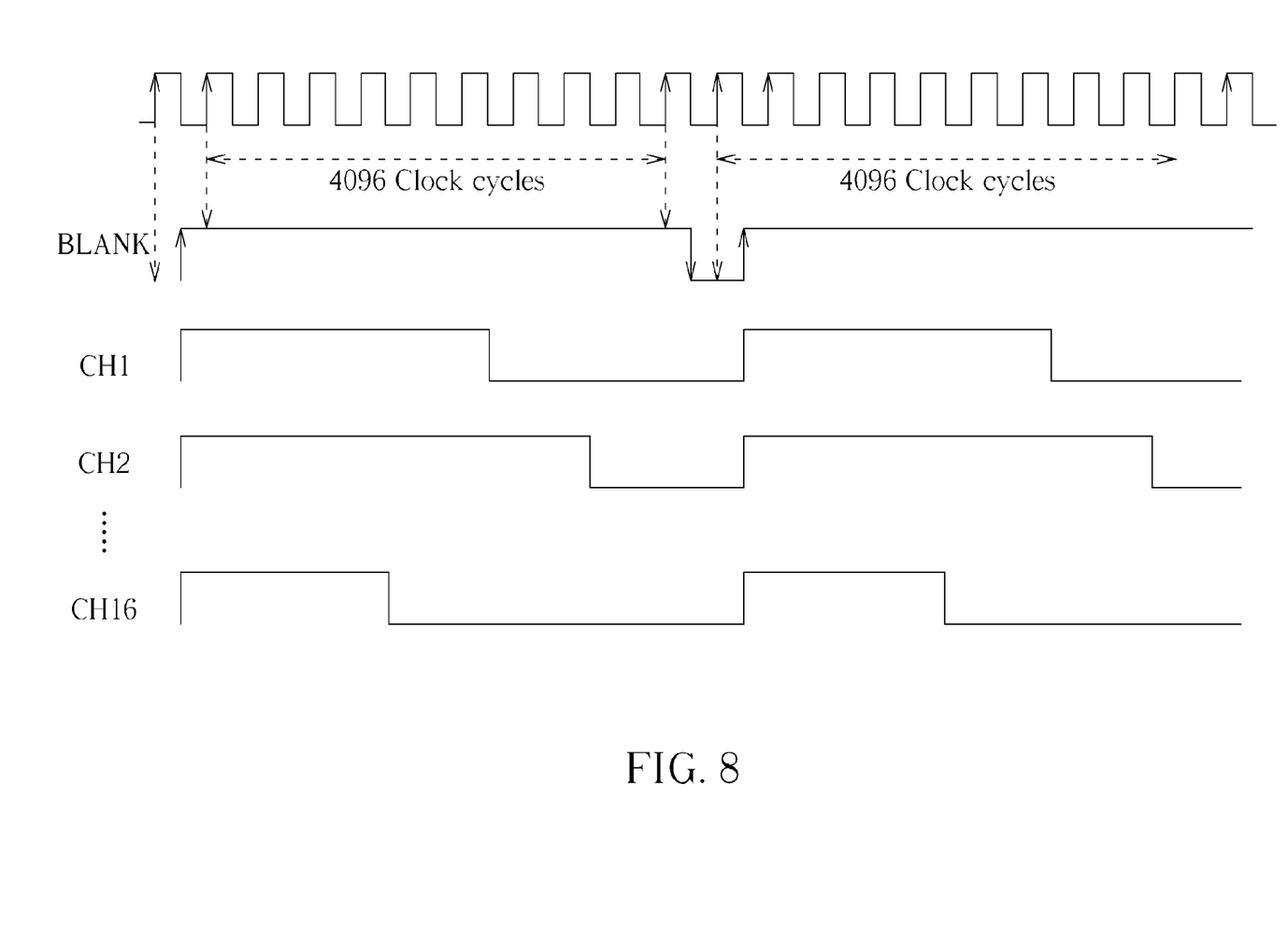
FIG. 8 is a PWM timing diagram of all channels when the backlight control device is in the dynamic PWM mode.

FIG. 8 is a PWM timing diagram of all channels when the backlight control device is in the dynamic PWM mode. When the signal BLANK is at the rising edge, the latched data (grey levels of video frames) are stored in the PWM registers of PWM control units. When the signal BLANK is at the falling edge, the control signals of PWM control units are reset to zero.

Figure 9:
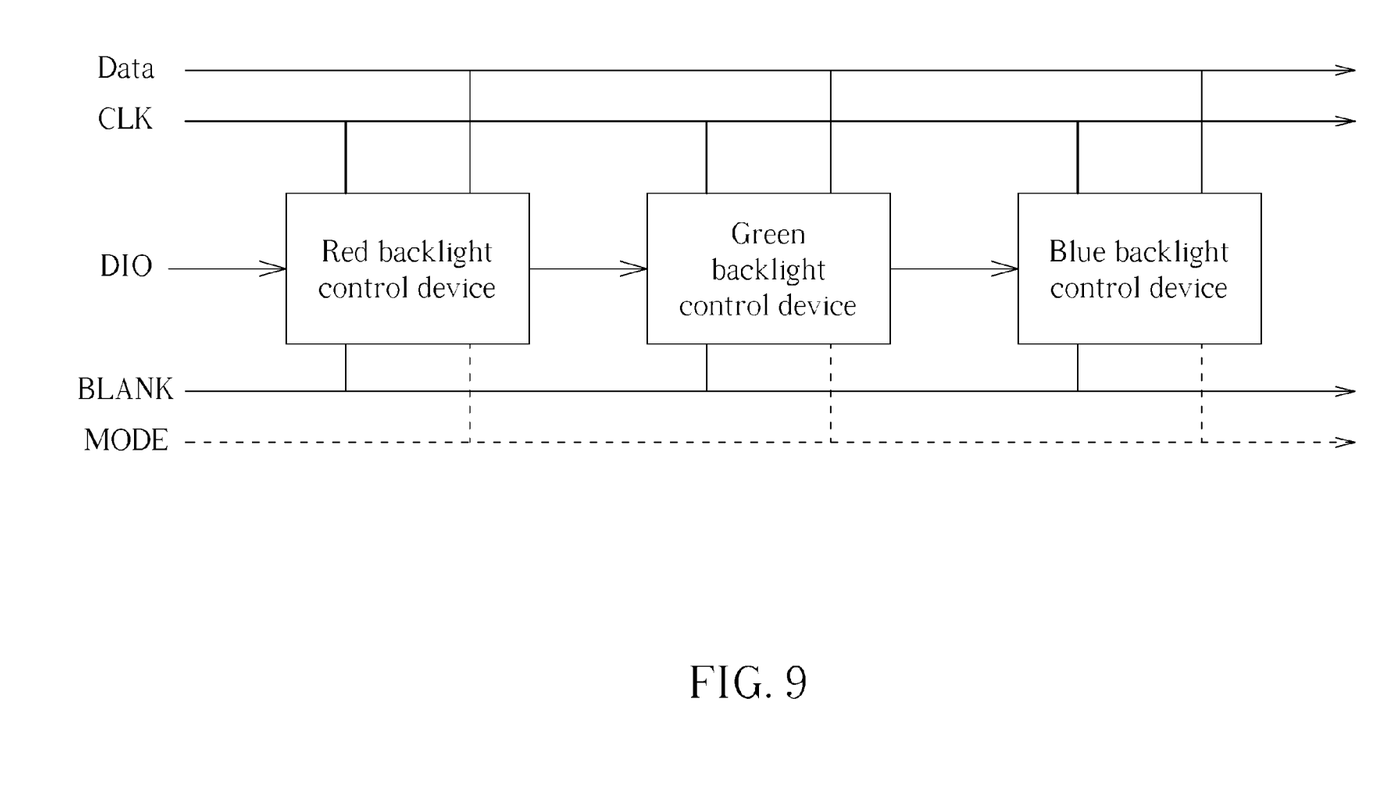
FIG. 9 shows an embodiment of controlling red, green and blue primary colors according to the present invention.

FIG. 9 shows an embodiment of controlling red, green and blue primary colors according to the present invention. The red, green and blue backlight devices can use any of the backlight control devices shown in FIG. 2, 3, 4, 5 or 6 for controlling the red, green and blue backlight.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight control device for controlling a driving current of a light-emitting diode, comprising:
   a pulse width modulation (PWM) control unit comprising:
      a register coupled to a shift register; and
      a control unit having an input node coupled to the register, and an output node;
   a current output unit coupled to the PWM control unit, comprising:
      a current source; and
      a transistor having a terminal coupled to the current source, and a gate coupled to the output node of the control unit of the PWM control unit; and
   the shift register, coupled to the PWM control unit, for storing control signals for controlling the PWM control unit;
   wherein the control unit regulates opening and closing of the gate of the transistor.

2. The backlight control device of claim 1 wherein the transistor of the current output unit is an NMOS, and the terminal is a source terminal of the NMOS.

3. The backlight control device of claim 1 wherein the transistor of the current output unit is a PMOS, and the terminal is a drain terminal of the PMOS.

4. A method of driving a light-emitting diode (LED), comprising:
   storing a first control signal in a pulse width modulation (PWM) control unit;
   storing a second control signal in a current control unit;
   regulating voltage of a current source of a current output unit for driving the LED according to the second control signal; and
   regulating output current of the current output unit according to the first control signal.

5. The method of claim 4, wherein regulating the output current of the current output unit according to the first control signal comprises:
   controlling opening and closing of a transistor coupled between the current source and the LED according to the first control signal.

6. The method of claim 4, wherein storing the first control signal in the PWM control unit comprises:
   storing the first control signal in a register of the PWM control unit.

7. The method of claim 4, wherein storing the second control signal in the current control unit comprises:
   storing the second control signal in a register of the current control unit.

8. The method of claim 4, wherein storing the first control signal in the PWM control unit comprises:
   storing the first control signal in the PWM control unit according to a mode of a selector.

9. The method of claim 4, wherein storing the second control signal in the current control unit comprises:
   storing the second control signal in the current control unit according to a mode of a selector.

10. The method of claim 4, wherein regulating the voltage of the current source of the current output unit for driving the LED according to the second control signal comprises:
   regulating the voltage of the current source of the current output unit by a control unit of the current control unit for driving the LED according to the second control signal.

11. The method of claim 4, wherein regulating the output current of the current output unit according to the first control signal comprises:
   regulating the output current of the current output unit by a control unit of the PWM control unit for driving the LED according to the first control signal.

* * * * *